No. 804,118. PATENTED NOV. 7, 1905.
H. D. GUFFEY.
PLANTER.
APPLICATION FILED SEPT. 7, 1905.
2 SHEETS—SHEET 1.
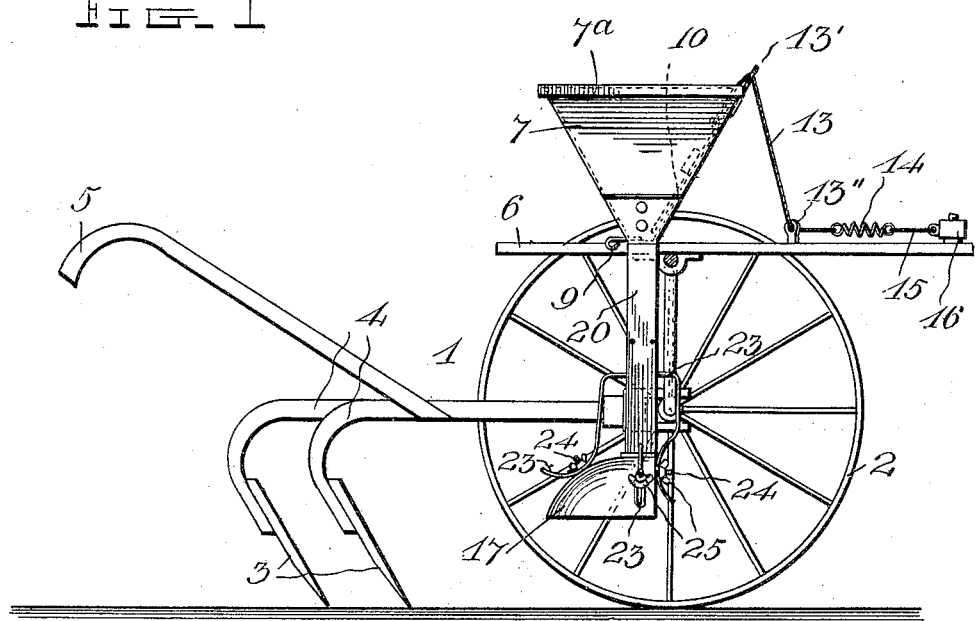

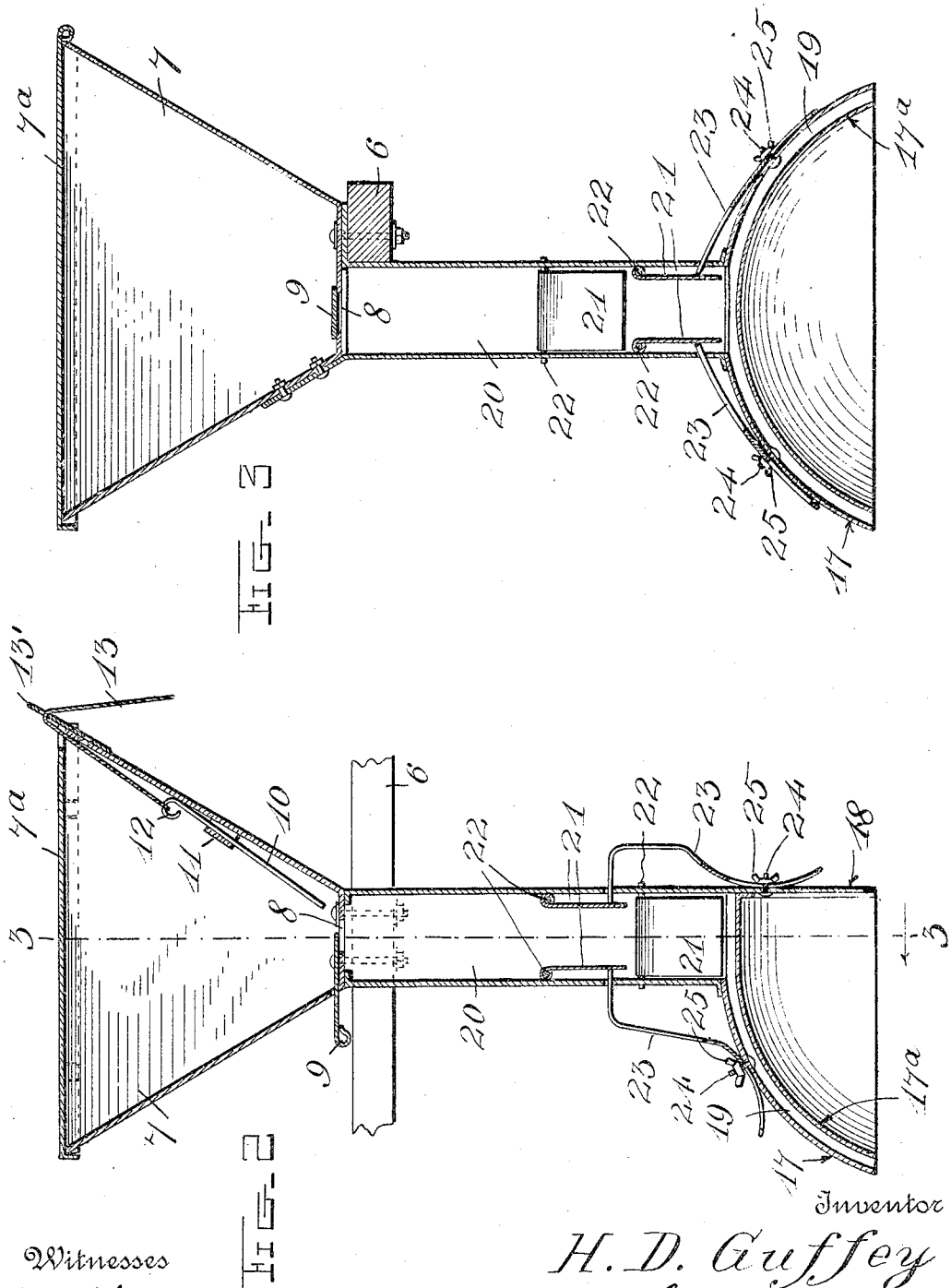

UNITED STATES PATENT OFFICE.

HAMILTON DAVIS GUFFEY, OF UNIONVILLE, MISSOURI.

PLANTER.

No. 804,118.  Specification of Letters Patent.  Patented Nov. 7, 1905.

Application filed September 7, 1905. Serial No. 277,392.

*To all whom it may concern:*

Be it known that I, HAMILTON DAVIS GUFFEY, a citizen of the United States, residing at Unionville, in the county of Putnam and State of Missouri, have invented certain new and useful Improvements in Planters; and I do declare the following to be a full, clear, and exact description of the invention, such as will enable others skilled in the art to which it appertains to make and use the same.

This invention relates to planters, and is more particularly designed as an attachment to an ordinary cultivator; and one of the principal objects of the same is to provide means for depositing the grain in a continuous line transversely in front of the shovels of the cultivator and to provide a shield to protect the grain from gusts of wind until it has been properly covered.

Another object is to provide simple and efficient means for regulating the flow of seed and deflecting the seed from one side to the other of the center of the planter.

Still another object is to provide a comparatively light, durable, and efficient seeder attachment which can be quickly attached to and detached from a cultivator of the usual construction.

I have also provided simple and convenient means for agitating the seeds in the hopper to prevent clogging of the seed.

These and other objects are attained by means of the construction illustrated in the accompanying drawings, in which—

Figure 1 is a side view of a planter made in accordance with my invention and attached to a cultivator of ordinary construction. Fig. 2 is a longitudinal vertical sectional view of the planter attachment. Fig. 3 is a sectional view taken on the line 3 3 of Fig. 2. Fig. 4 is a plan view of the hopper with the cover removed, and Fig. 5 is a plan view in partial section of the seed-hopper.

Referring to the drawings for a more particular description of the invention, the numeral 1 designates a cultivator, of ordinary or any suitable construction, mounted on wheels 2 and provided with shovels 3, beams 4, and handles 5. At a suitable point under the tongue 6 of the cultivator my planter may be suspended by suitable fastening means.

The hopper 7 is provided with an outlet-opening 8 in its bottom, and a sliding valve 9 may be adjusted to regulate the flow of seed from the hopper. To prevent the grain from clogging the outlet 8, an agitator 10 is mounted in a keeper or guide 11, secured to one of the walls of the hopper, and at its upper end the agitator is provided with a loop or eye 12, to which is attached a cord or chain 13, passed through eyes 13' and 13''. A spiral spring 14 is attached to the cord or chain 13, and a similar cord or chain 15 is connected to the spring 14 and extends to some movable part of the vehicle, to which it is attached for the purpose of giving movement to the agitator to prevent the grain from clogging the opening 8. The cord 15 is herein shown attached to one of the swingletrees 16 of the cultivator.

The hopper 7 is provided with a hinged cover 7ª, and the discharge end of said hopper is disposed above the inlet end of the seed-dropper. This seed-dropper comprises two curved members forming the segment of a dome, the outer member consisting of a curved front wind-shield 17 and a vertical rear wall 18, and the inner section 17ª is spaced from the chamber 17 to form a substantially semicircular discharge opening or space 19. The rear edge of the member 17ª is secured to the inner wall 18 of the member 17. The two members 17 17ª may be conveniently formed of comparatively thin, but strong sheet metal. An inlet-spout 20 is formed on or secured to the upper rear end of the section 17, and the hopper 7 is suitably secured to said spout and supported thereon in position to feed the grain thereto. Within the spout 20 are a series of valves or deflectors 21, consisting of plates hinged at their upper ends to pintles 22. One pair of these valves are disposed in one horizontal plane at opposite sides of the spout 20, while the other pair of valves are located in another horizontal plane and hinged at right angles to the first-mentioned pair. Adjusting-rods 23 pass through the walls of the spout 20, and the outer ends of said rods are provided with adjusting-screws 24 and nuts 25, by means of which the valves may be adjusted to deflect the grain or seed to drop at one side or the other of the dropper or to cut off the flow, as will be understood. The upper pair of valves may be adjusted to deflect the seed backward to deposit two rows of seed across the field or forward to cast a line of less width.

The operation of the invention will be readily understood from the foregoing and may be briefly described as follows: As the cultivator is taken across the field the seed from the hopper is fed into the spout 20 and deflected by the valves 21 to drop the seed in the quantity and in the location desired, the agitator 10 being moved up and down in the hopper to prevent the seed from clogging the outlet-opening 8.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a planter attachment for cultivators, a dropper comprising two curved members spaced apart to form a semicircular discharge-opening, a spout above the dropper, adjustable valves in said spout and a hopper disposed above the valves, substantially as described.

2. In a planter attachment for cultivators, a hopper, an agitator mounted to move up and down therein, and a flexible and elastic connection leading from the agitator to a movable part of the cultivator-vehicle.

3. In a planter, a segmental dome-shaped dropper, comprising two curved members spaced apart to provide a semicircular discharge-opening, a spout above the dropper, a series of valves in said spout and means for adjusting said valves to deflect the seed and regulate the feed, substantially as described.

4. In a planter, a dropper comprising curved spaced members having a semicircular discharge-opening, a spout above the dropper, valves in the spout, said valves being arranged in pairs, one pair being hinged at right angles to the others, substantially as described.

In testimony whereof I have hereunto set my hand in presence of two subscribing witnesses.

HAMILTON DAVIS GUFFEY.

Witnesses:
 LORENZO JONES,
 ALMA JONES.